UNITED STATES PATENT OFFICE.

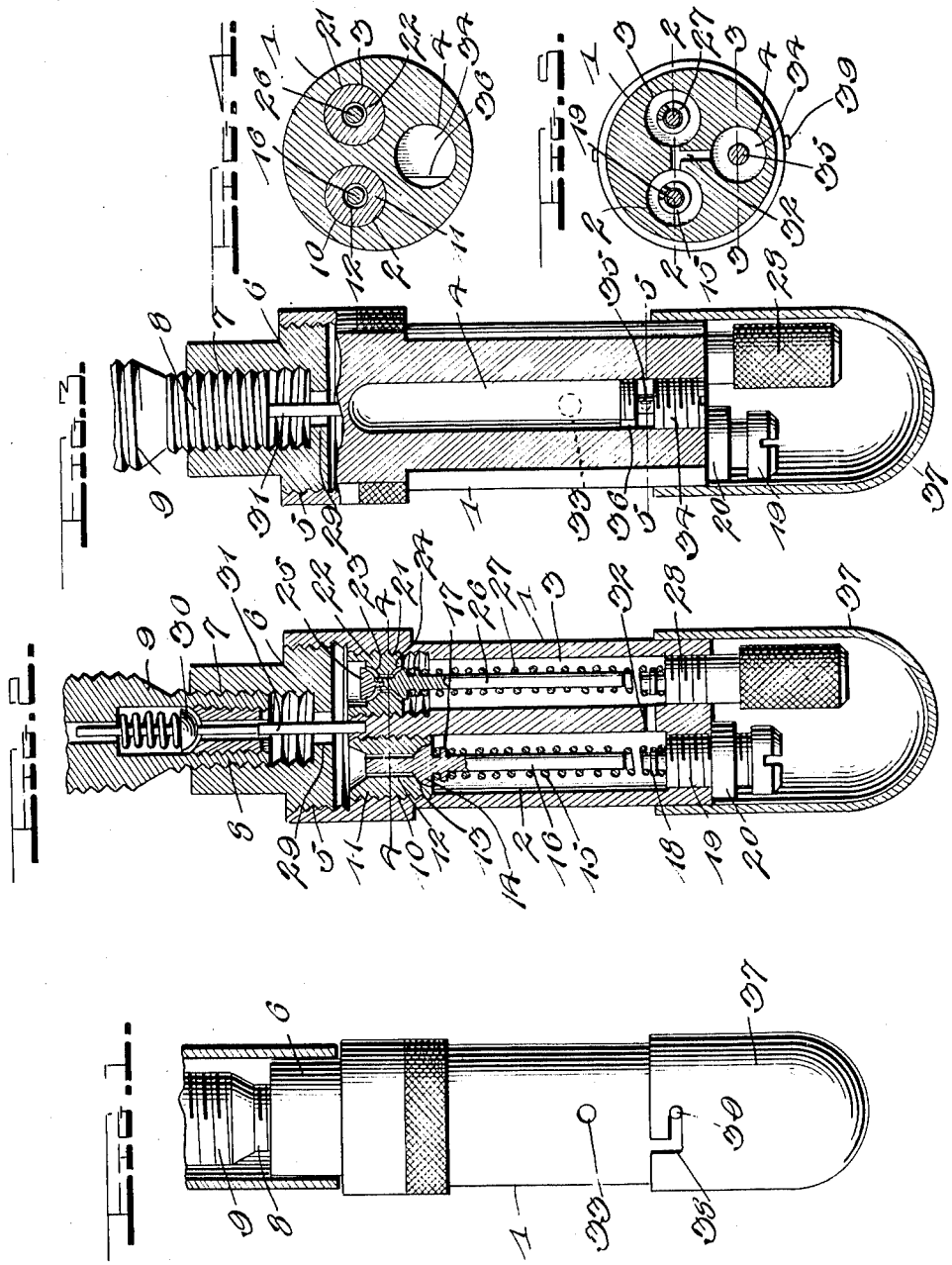

JOSEPH B. POLO, OF CLEAR LAKE, SOUTH DAKOTA.

TIRE-ALARM.

1,061,200.   Specification of Letters Patent.   Patented May 6, 1913.

Application filed April 27, 1912. Serial No. 693,512.

*To all whom it may concern:*

Be it known that I, JOSEPH B. POLO, a citizen of the United States, residing at Clear Lake, in the county of Deuel and State of South Dakota, have invented certain new and useful Improvements in Tire-Alarms, of which the following is a specification, reference being had to the accompanying drawings.

This invention comprehends certain new and useful improvements in automobile appliances or accessories, and relates particularly to the class of attachments known as tire alarms.

The invention has for its primary object a simple and efficient device of this character which may be easily applied to the valve stem of a pneumatic tire and which will automatically produce an audible signal when the air pressure becomes reduced below a predetermined point or increased above a predetermined limit of inflation, the device remaining inoperative so far as its signal producing apparatus is concerned, while the pressure remains between the predetermined maximum and minimum points between which it is desired to have the tire inflated and interfering in no wise with the serviceability or resiliency of the tire.

A further object of the invention is a simple, durable and efficient construction of tire alarm, the parts of which may be easily manufactured and assembled and which will not be liable to get out of order, and which will be so arranged that they may be adjusted, so that the points of minimum and maximum pressure may be varied at will, according to the particular tire to which the device is attached. And the invention also aims to generally improve devices of this class and to render them more useful and commercially desirable.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawing, in which, Figure 1 is a side elevation of a tire alarm embodying the principles and improvements of my present invention. Fig. 2 is a longitudinal sectional view thereof on the line 2—2 of Fig. 5. Fig. 3 is a similar view on the line 3—3 of Fig. 5, and, Figs. 4 and 5 are transverse or horizontal sectional views on the lines 4—4 and 5—5 of Figs. 2 and 3 respectively.

Corresponding and like parts are referred to in the following description and indicated in all the views of the accompanying drawing by like reference characters.

My improved tire alarm includes a casing 1, which is formed in the present embodiment of the invention with three longitudinally extending bores designated 2, 3 and 4 respectively, said bores being arranged in equidistant relation to each other as clearly illustrated in Figs. 4 and 5. The casing 1 is interiorly threaded at one end as indicated at 5 for engagement by a threaded bushing 6, said bushing being interiorly threaded as indicated at 7 whereby it may be readily attached to the ordinary screw threaded nipple 8 of an inflation valve stem 9 of the ordinary pneumatic tire.

One end of the bore 2 is interiorly threaded as indicated at 10 to receive the plug 11 which is secured therein and which is formed with a longitudinally disposed opening 12 extending therethrough and terminating at its outer end in a valve seat 13. A valve 14 is adapted to engage the seat 13, the said valve being pressed inwardly on its seat by means of a coiled expansion spring 15 which encircles the valve stem 16 and which is secured at one end to a collar 17 formed on the valve stem and at its other end to a collar 18 formed on the inner end of a tension adjusting screw 19 which works in the outer end of the bore 2. Preferably the screw 19 is provided with a jam nut 20 whereby it may be securely held in adjusted position. The bore 3 is also interiorly threaded at its inner end as indicated at 21 for the reception of a threaded plug 22, said plug being formed with an opening extending therethrough and communicating at its ends with an inwardly facing valve seat 23 and an outwardly facing valve seat 24. A double headed valve 25 has the shank which connects its two heads together mounted in the opening formed in the bushing 22, the two heads of the valve being adapted to alternately engage the valve seats 23 and 24 respectively, as will be hereinafter more fully set forth. The valve 25 is provided with a stem 26 which is mounted in the bore 3 and which is encircled by a coil spring 27, one end of said spring being screwed to a collar formed on the valve stem and the other end of the spring being screwed to a collar which is formed on the inner end of a thumb screw 28 which works in the outer end of the bore 3 and is preferably milled or serrated on its periphery so that it may be easily manipulated.

The bushing 6 hereinbefore mentioned is formed with an opening 29 which leads to the inner ends of the bores 2 and 3 and which also communicates with the opening leading into the nipple 8 in which the ordinary spring seated tire valve 30 is mounted. The relatively stationary pin 31 is secured to the inner end of the casing 1, and it is designed, when the casing is screwed on the nipple 8 through the instrumentality of the bushing 6, that the pin 31 will engage the outwardly extending stem of the valve 30 and move and hold the valve 30 away from its seat, against the tension of its spring.

The bore 4 is in open communication with the bores 2 and 3 by means of transverse passages 32 as best illustrated in Figs. 2 and 5, the bore 4 being formed with an opening 33 leading to the atmosphere. In order to produce a sound when the air is permitted to flow into either of the bores 2 or 3, a screw threaded plug 34 is screwed into the outer end of the bore 4, said plug being formed with an annular groove 35 in registry with the passages 32 and with a cutaway portion 36, whereby a hissing sound will be produced by the air passing around the neck formed by the groove 35 and out into and through the bore 4 past the cutaway portion 36 of the plug.

In the practical use of my improved tire alarm, the casing 1 is screwed on the nipple 8 of the inflation valve, the pin 31 pressing the valve 30 back or away from its seat and thereby admitting air into the inner end of the attachment. The spring 15 is adjusted for the high pressure. That is to say, if it be desired that the pressure in the tire shall not exceed 70 pounds per square inch without apprising the driver or operator of the vehicle, the screw 19 is turned so as to produce a tension of 70 pounds on the spring 15 which holds the valve 14 on its seat 13. Should, then, the pressure rise or exceed 70 pounds from any cause, it is obvious that the valve 14 will be forced outwardly away from its seat and thus constitute a safety valve for the tire, the air which passes around the valve 14 issuing through the bore 2 and out into the bore 4 and to the atmosphere so as to produce an audible signal. Manifestly, when the pressure is reduced by this means to the predetermined point, the valve 14 will shut off and in no wise interfere with the operation of the tire at its maximum predetermined pressure.

In the practical use of the device as an attachment designed to produce an audible signal when the tire becomes deflated from any cause to a dangerous or undesirable point, it is to be understood that when the device is applied to the nipple 8, the thumb screw 28 is worked outwardly in the bore 3 and, owing to the connection between the thumb screw 28, spring 27 and the collar of the valve stem 26, the double headed valve will be moved outwardly so that the inwardly facing valve head will be maintained on the inwardly facing valve seat 23 and thus prevent the escape of air through the opening in the bushing 22 while the attachment is being secured in place and the pin 31 is moving the ordinary valve 30 to the open position. After the device has been secured in place, the thumb screw 28 is given one or two turns in the reverse direction so as to bring it back to the normal position where, under atmospheric pressure, the two valve heads would be equally spaced from the valve seats 23 and 24, but, as is evident, the pressure within the tire, coming against the spring 27, will securely hold the inwardly facing head of the valve 25 on the seat 23 and thus prevent any escape of air into the bore 3 so long as the air pressure is above the predetermined minimum point. As soon as the air pressure becomes reduced below such predetermined point, (which is governed by the tension which is imposed upon the spring 27) the said air pressure within the tire can no longer overcome the tension of the spring 27, and consequently the spring 27 will be permitted to act under such conditions to move the valve 25 inwardly a distance sufficient to hold both of the valve heads away from their respective seats, and consequently the air may rush out into the bore 3 and force itself through the passage 32, under the groove 35 and cutaway portion 6 of the plug 34 and out into the bore 4, escaping into the atmosphere through the opening 33 so as to produce an audible signal.

It will thus be understood that my improved tire alarm not only operates to automatically give an audible signal when the pressure in the tire exceeds the predetermined maximum point, but also gives an alarm when the pressure is reduced beyond the desired minimum point.

If desired, the outer end of the casing may be covered by a detachable cap 37 to protect the screws 19 and 28, said cap being formed with an angular slot 38 designed for engagement with a stud or pin 39 projecting outwardly from the casing 1.

It is, of course, understood that after the inwardly facing head of the valve 25 is moved away from its seat and the air permitted to escape, a further reduction of pressure will shortly thereafter permit the spring 27 to act to move the outwardly facing head of said valve against the outwardly facing seat 24 so as to prevent the air pressure from becoming entirely exhausted.

Having thus described my invention what I claim is:

1. A tire alarm, including a casing designed for attachment to the inflation valve stem of a pneumatic tire and formed with separate bores adapted to communicate at one end with the interior of said inflation valve stem, one of said bores containing an outwardly facing valve seat, a valve adapted to rest thereon, means for yieldingly holding said valve on its seat, the other bore containing both inwardly and outwardly facing valve seats in communication with each other, a valve provided with two heads adapted to alternately seat against the said respective inwardly and outwardly facing valve seats of the second named bore, and yielding means connected to the last named valve and tending to hold the valve in an inner position with the outermost head resting against its outwardly facing valve seat.

2. A tire alarm, including a casing designed for attachment to the inflation valve stem of a pneumatic tire and formed with separate bores adapted to communicate at one end with the interior of said inflation valve stem, one of said bores containing an outwardly facing valve seat, a valve adapted to rest thereon, means for yieldingly holding said valve on its seat, the other bore containing both inwardly and outwardly facing valve seats in communication with each other, a valve provided with two heads adapted to alternately rest against the said respective inwardly and outwardly facing valve seats of the second named bore, and means tending to hold the valve in an inner position with the outermost head resting against its outwardly facing valve seat, said means being yieldable in both directions, for the purpose specified.

3. A tire alarm, including a casing designed for attachment to the inflation valve stem of a pneumatic tire and formed with separate bores adapted to communicate at one end with the interior of said inflation valve stem, one of said bores containing an outwardly facing valve seat, a valve adapted to rest thereon, means for yieldingly holding said valve on its seat, the other bore containing both inwardly and outwardly facing valve seats in communication with each other, a valve provided with two heads adapted to alternately seat against the said respective inwardly and outwardly facing valve seats of the second named bore, a spring connected to said last named valve and tending to hold the same in an inner position with the outermost head resting against the outwardly facing valve seat, and adjusting means secured to the casing and connected to said spring and movable in a direction to draw one head against the inwardly facing valve seat or press the other head against the outwardly facing valve seat.

4. A tire alarm, including a casing designed for attachment to the inflation valve stem of a pneumatic tire and formed with separate bores adapted to communicate at one end with the interior of said inflation valve stem, one of said bores containing an outwardly facing valve seat, a valve adapted to rest thereon, a spring connected to said valve and adapted to hold it on its seat, an adjusting screw working in the end of said bore and connected to said spring to adjust the tension thereof, the other bore containing both inwardly and outwardly facing valve seats in communication with each other, a valve provided with two heads adapted to alternately seat against said respective inwardly and outwardly facing valve seats of the second named bore, a spring connected to said last named valve, and an adjusting screw working in the end of the second named bore and connected to said spring and movable in a direction to draw one head against the inwardly facing valve seat or press the other head against the outwardly facing valve seat.

5. A tire alarm including a casing designed for attachment to the inflation valve stem of a pneumatic tire and formed with three separate and distinct bores extending longitudinally of the casing, one of said bores containing an outwardly facing valve seat and another containing an inwardly facing valve seat and an outwardly facing valve seat, a valve adapted to rest on the first named outwardly facing valve seat, means for yieldingly holding said valve thereon, a two-headed valve adapted to rest on the inwardly facing valve seat and the corresponding inwardly facing seat, and means tending to hold the last named valve in an inner position with the outermost head resting against the second named outwardly facing valve seat, the casing being formed with an opening leading from the third bore to the atmosphere and with passages establishing communication between the third bore and the other two bores.

6. A tire alarm, including a casing designed for attachment to the inflation valve stem of a pneumatic tire, and formed with separate bores adapted to communicate at one end with the interior of said inflation valve stem, one of said bores containing an outwardly facing valve seat, a valve adapted to rest thereon, means for yieldingly holding said valve on its seat, the other bore containing both inwardly and outwardly facing valve seats in communication with each other, a valve provided with two heads adapted to alternately seat against the said respective inwardly and outwardly facing valve seats of the second named bore, a spring connected to said last named valve and adjustable means secured to the casing and connected to said spring and movable in a direction to draw one head against the inwardly facing valve seat or press the other head against the outwardly facing valve seat.

7. A tire alarm, including a casing, designed for attachment to the inflation valve stem of a pneumatic tire and formed with three separate and distinct bores extending longitudinally of the casing, one of said bores containing an outwardly facing valve seat and another containing an inwardly facing valve seat, a valve adapted to rest on the outwardly facing valve seat, means for yieldingly holding said valve thereon, a valve adapted to rest on the inwardly facing valve seat, means tending to move the last named valve away from the inwardly facing valve seat, the casing being formed with an opening leading from the third bore to the atmosphere, and with passages establishing communication between the third bore and the other two bores, and a plug closing the end of the third bore and formed with an annular groove in registry with the passages, the plug being also formed with a recess establishing communication between the said opening and said groove, for the purpose specified.

In testimony whereof I hereunto affix my signature in the presence of two witnesses.

JOSEPH B. POLO.

Witnesses:
E. E. WALSETH,
J. H. BREKKEN.